(12) United States Patent
Lee et al.

(10) Patent No.: US 9,275,224 B2
(45) Date of Patent: Mar. 1, 2016

(54) APPARATUS AND METHOD FOR IMPROVING DETECTION PERFORMANCE OF INTRUSION DETECTION SYSTEM

(71) Applicant: ELECTRONICS AND TELECOMMUNICATIONS RESEARCH INSTITUTE, Daejeon (KR)

(72) Inventors: NamHoon Lee, Daejeon (KR); Seokwon Lee, Daejeon (KR); Soonjwa Hong, Daejeon (KR); TaekKyu Lee, Daejeon (KR); KyuCheol Jung, Daejeon (KR); Geunyong Kim, Daejeon (KR); Hyung Geun Oh, Daejeon (KR); Ki Wook Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/338,917

(22) Filed: Jul. 23, 2014

(65) Prior Publication Data
US 2015/0113646 A1    Apr. 23, 2015

(30) Foreign Application Priority Data
Oct. 18, 2013   (KR) .................. 10-2013-0124662

(51) Int. Cl.
*G06F 11/00*    (2006.01)
*G06F 21/55*    (2013.01)
(Continued)

(52) U.S. Cl.
CPC .......... *G06F 21/554* (2013.01); *H04L 63/1408* (2013.01)

(58) Field of Classification Search
None
See application file for complete search history.

(56) References Cited

U.S. PATENT DOCUMENTS

| 7,818,797 | B1 * | 10/2010 | Fan | ................... G06F 21/55 726/22 |
| 2004/0205360 | A1 * | 10/2004 | Norton | ............... H04L 63/0227 726/23 |

(Continued)

FOREIGN PATENT DOCUMENTS

| KR | 10-2006-0121653 A | 11/2006 |
| KR | 10-0772523 B1 | 10/2007 |

(Continued)

OTHER PUBLICATIONS

Giorgos Vasiliadis et al, "Regular Expression Matching on Graphics Hardware for Intrusion Detection," International Symposium on Recent Advances in Intrusion Detection, 2009.

(Continued)

*Primary Examiner* — Michael R Vaughan
*Assistant Examiner* — Trang Doan
(74) *Attorney, Agent, or Firm* — LRK Patent Law Firm

(57) ABSTRACT

An apparatus for improving detection performance of an intrusion detection system includes a transformed detected data generation unit for changing original detected data, detected based on current detection rules, to transformed detected data complying with transformed detected data standard. A transformed detected data classification unit classifies the transformed detected data by attack type, classifies transformed detected data for attack types by current detection rule, and classifies transformed detected data for detection rules into true positives/false positives. A transformed keyword tree generation unit generates a true positive transformed keyword tree and a false positive transformed keyword tree. A true positive path identification unit generates a true positive node, and identifies a true positive path connecting a base node to the true positive node in the true positive transformed keyword tree. A true positive detection pattern generation unit generates a true positive detection pattern based on the true positive path.

16 Claims, 4 Drawing Sheets

(51) Int. Cl.
*H04L 29/06* (2006.01)
*G06F 12/14* (2006.01)
*G06F 12/16* (2006.01)

(56) References Cited

U.S. PATENT DOCUMENTS

2008/0034433 A1   2/2008  Kim et al.
2008/0263661 A1*  10/2008 Bouzida .............. H04L 63/1416
                                                     726/22
2014/0337271 A1*  11/2014 Cox ....................... G06N 5/025
                                                     706/47
2015/0039629 A1*  2/2015  Theeten ............ G06F 17/30628
                                                     707/747

FOREIGN PATENT DOCUMENTS

KR      10-0772177 B1    11/2007
KR      10-0984282 B1     9/2010
KR    10-2011-0098269 A   9/2011
WO      2005/045707 A1    5/2005

OTHER PUBLICATIONS

Hyung-Woo Lee et al, "High-Speed Search Mechanism based on B-Tree Index Vector for Huge Web Log Mining and Web Attack Detection," Journal of Korea Multimedia Society vol. 11. Nov. 2008 (pp. 1601-1614).

* cited by examiner

APPARATUS AND METHOD FOR IMPROVING DETECTION PERFORMANCE OF INTRUSION DETECTION SYSTEM

CROSS REFERENCE TO RELATED APPLICATION

This application claims the benefit of Korean Patent Application No. 10-2013-0124662, filed on Oct. 18, 2013, which is hereby incorporated by reference in its entirety into this application.

BACKGROUND OF THE INVENTION

1. Technical Field

The present invention relates generally to an apparatus and method for improving the detection performance of an intrusion detection system and, more particularly, to an apparatus and method that can exactly detect snort-based intrusion detection rules applied to a network intrusion detection system and can reduce the false positive rate of existing intrusion detection rules.

2. Description of the Related Art

Generally, as numerals in detection rules increase, the detection rate of attacks may increase. However, this results in the deterioration of systematic performance, such as the number of detection rules, detection time, and storage space, and the deterioration of efficiency of security control tasks, such as a long analysis time required by an analyzer to analyze detection events.

In order to improve the true positive rate of detection rules, a commercial system optimizes detection rules depending on its own optimization scheme and maintains the detection rules at a constant level. In this case, a scheme for eliminating the oldest detection rule or a detection rule having a low detection rate and applying a new detection rule if the constant level of detection rules is exceeded, or a scheme for reflecting the results of analysis depending on the ability of an analysis team is utilized.

However, in security control tasks, if detection events of several gigabytes are accumulated per day, and an analyzer analyzes the detection events, a long analysis time is required, thus deteriorating task efficiency.

Accordingly, in order to reduce the false positive rate of detection rules, technical optimization methods have been used. However, since such a method merely analyzes and improves only the detection rules, various interference factors in a network environment cannot be reflected.

Therefore, a starting point for improvement of detection efficiency is to create detection rules so that true positives can be precisely determined using the detection rules of traffic identified by a firewall, an intrusion detection system (IDS), and an intrusion detection sensor, and thus to improve the true positive rate.

In the past, upon creating the detection rules of a snort-based intrusion detection system, the detection rules were classified into IP-based detection rules and packet payload-based pattern detection rules, and then created.

In particular, pattern detection rules are created based on specific patterns appearing on a packet payload by analyzing malicious code and attack techniques that may occur in network-based intrusion behavior. However, upon creating pattern detection rules, various types of detection rule patterns may be generated depending on the results of analysis by detection rule creators. Further, due to the diversity of packet payloads, more false positives (or higher false detection) than those of IP-based detection rules may occur.

Furthermore, after the detection rules have been created, they are immediately applied to an intrusion detection system in operation in the state in which the detection rules are used to merely determine whether an intrusion has been detected and in which a process required for supplementing the degree of completion of detection rules is not yet applied, thus making it difficult to apply the improvement of the true positive rate of intrusion detection rules and the supplementation of the false positive rate for a predetermined period of time. Further, in the case of intrusion false positive events occurring for that period of time, an analyzer analyzes the events one by one and determines whether true positives or false positives have occurred, and thus there is a limitation in improving the efficiency of intrusion detection tasks. In particular, a large number of intrusion false positive events occurring due to detection rules including errors may become the major cause of the deterioration of efficiency when performing security control tasks.

As related preceding technology, Korean Patent Application Publication No. 10-2011-0098269 (entitled "Intrusion detection method using pattern searching") discloses technology for defining the patterns of known attack techniques or malicious codes as forbidden character strings and then efficiently determining whether a forbidden character string is included in a given input character string.

The invention disclosed in Korean Patent Application Publication No. 10-2011-0098269 defines the patterns of known attack techniques or malicious codes as forbidden character strings, and configures the defined forbidden character strings as a generalized suffix tree, thus efficiently determining whether a given input character string on a network includes a forbidden character string.

However, the above-described invention disclosed in Korean Patent Application Publication No. 10-2011-0098269 is merely intended to configure partial character strings of a forbidden character string set as a generalized suffix tree, and thus to rapidly detect whether a forbidden character string is included in a given input character string on the network.

SUMMARY OF THE INVENTION

Accordingly, the present invention has been made keeping in mind the above problems occurring in the prior art, and an object of the present invention is to provide an apparatus and method for improving the detection performance of an intrusion detection system, which can optimize detection rules by improving the true positive rate of intrusion detection rules of the intrusion detection system.

In accordance with an aspect of the present invention to accomplish the above object, there is provided an apparatus for improving detection performance of an intrusion detection system, including a transformed detected data generation unit for changing pieces of original detected data, detected based on current detection rules, to pieces of transformed detected data complying with a transformed detected data standard; a transformed detected data classification unit for classifying the pieces of transformed detected data by attack type, classifying pieces of transformed detected data for respective attack types by current detection rule, and classifying pieces of transformed detected data for respective detection rules into true positives/false positives; a transformed keyword tree generation unit for generating a true positive transformed keyword tree and a false positive transformed keyword tree, based on results of classification by the transformed detected data classification unit; a true positive path identification unit for generating a true positive node by comparing the true positive transformed keyword tree with the false positive transformed keyword tree, and for identifying a true positive path connecting a base node to the true positive node in the true positive transformed keyword tree; and a true positive detection pattern generation unit for generating a true positive detection pattern based on the identified true positive path.

The transformed detected data standard may include a plurality of fields including source Internet Protocol (IP) field, source port field, destination IP field, destination port field, payload field, and true positive/false positive identification information field.

The plurality of fields may further include a serial number field or a message field for detection rules.

The true positive transformed keyword tree may include a plurality of nodes, each including a symbol at a current position and a traversal count value passing through the symbol at the current position.

The false positive transformed keyword tree may include a plurality of nodes, each including a symbol at a current position and a traversal count value passing through the symbol at the current position.

The true positive path identification unit may set a node, remaining after nodes of the false positive transformed keyword tree have been excluded from the true positive transformed keyword tree, to the true positive node.

The true positive path identification unit may search for a node between the base node of the true positive transformed keyword tree and the true positive node, and set a connection path from a root node of the true positive transformed keyword tree to the true positive node via the searched node, as the true positive path.

The true positive detection pattern generation unit may create a new detection rule based on the generated true positive detection pattern.

In accordance with another aspect of the present invention to accomplish the above object, there is provided a method for improving detection performance of an intrusion detection system, including changing, by a transformed detected data generation unit, changing pieces of original detected data, detected based on current detection rules, to pieces of transformed detected data complying with a transformed detected data standard; classifying, by a transformed detected data classification unit, the pieces of transformed detected data by attack type, classifying, by the transformed detected data classification unit, pieces of transformed detected data for respective attack types by current detection rule, and classifying, by the transformed detected data classification unit, pieces of transformed detected data for respective detection rules into true positives/false positives; generating, by a transformed keyword tree generation unit, a true positive transformed keyword tree and a false positive transformed keyword tree, based on results of the classification; generating, by a true positive path identification unit, a true positive node by comparing the true positive transformed keyword tree with the false positive transformed keyword tree, and identifying, by the true positive path identification unit, a true positive path connecting a base node to the true positive node in the true positive transformed keyword tree; and generating, by a true positive detection pattern generation unit, a true positive detection pattern based on the identified true positive path.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
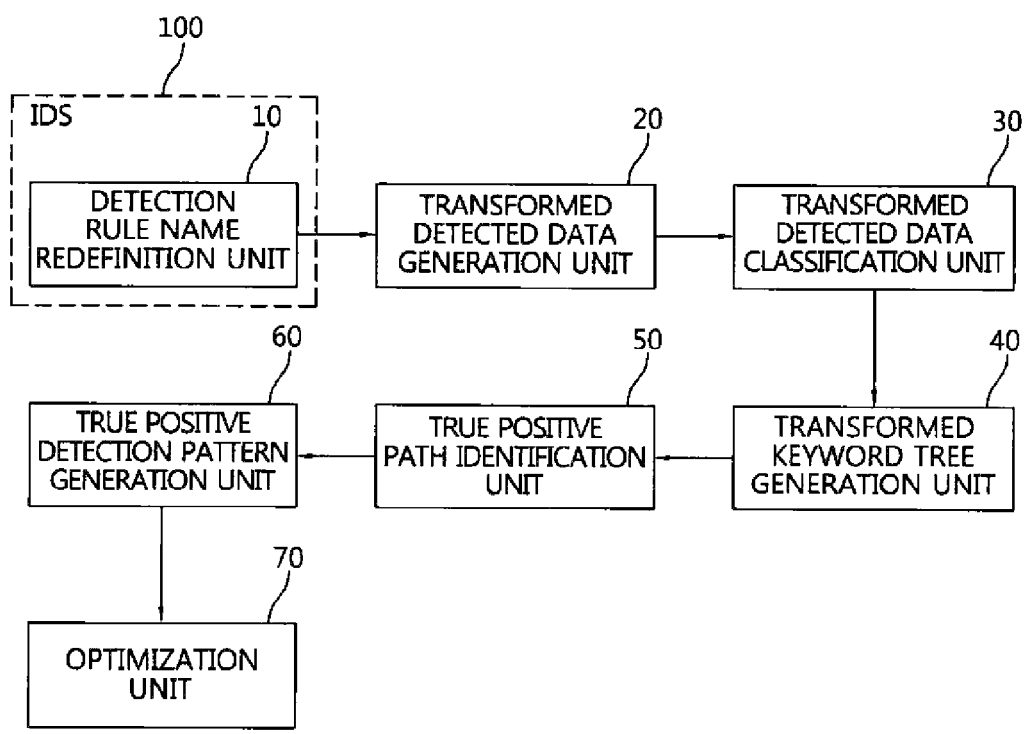
FIG. 1 is a configuration diagram showing an apparatus for improving the detection performance of an intrusion detection system according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

In the specification of the present invention, the term "intrusion" may be regarded as all actions taken to perform illegal access, illegal information fabrication, and system incapacitation on networks or computer systems. All actions violating the security policies of the system may be treated as intrusions regardless of whether the actions are intentional or accidental actions. That is, all actions violating the integrity, confidentiality, or availability of system resources may be defined as intrusions. An intrusion detection system is a system for detecting an intrusion externally made over a network or the like, and is configured to, when an intrusion action threatening the security of an information system occurs, detect the intrusion action and positively cope with it.

When a systemic load on memory and execution speed is tolerable in a procedure for optimizing detection rules, the present invention intends to achieve the purpose of optimizing detection rules and enhancing a detection rate by improving a true positive rate rather than reducing the number and capacity of detection rules. That is, when the true positive rate of detection rules is deteriorated, a plurality of false positive events occur, and thus the improvement of a detection rate cannot be expected due to difficulty in precise intrusion detection and the requirement of analysis time by an analyzer. Therefore, the present invention classifies unknown intrusion detection for detecting a new intrusion as an area for control task personnel and an analyzer, creates the form of previously detected intrusions as detection rules enabling exact detection, analyzes false positive components, and improves a true positive rate for the same event occurring in the future. An embodiment of the present invention presents a scheme for generating a transformed keyword tree (Traversal Count [TC] keyword tree) based on the true positive/false positive events of previously accumulated detection rules, creating optimal true positive intrusion detection rules using software, and maximizing a true positive rate.

FIG. 1 is a configuration diagram showing an apparatus for improving the detection performance of an intrusion detection system according to an embodiment of the present invention.

The apparatus for improving the detection performance of the intrusion detection system according to the embodiment of the present invention extracts all consecutive character string patterns that may occur in the packet payloads of all detection events, generated for a predetermined period of time, from detection rules in which False Positive (FP) events occur, generates TC-keyword trees for respective True Positive (TP) and FP events, and compares the generated TC-keyword trees with each other. Further, the apparatus searches for the configuration nodes of the True Positive (TP) TC-keyword tree which do not overlap the TC-keyword tree of the FP events generated in conformity with the rules, generate new patterns, and recreates detection rules based on the new patterns. When this procedure is continuously repeated at regular periods, new detection rules, by which a false positive rate can be reduced and a true positive rate can be improved for all events for which false positives occur, are continuously created.

For this, the apparatus for improving the detection performance of the intrusion detection system according to the embodiment of the present invention includes a detection rule name redefinition unit 10, a transformed detected data generation unit 20, a transformed detected data classification unit 30, a transformed keyword tree (TC-keyword tree) generation unit 40, a true positive path identification unit 50, a true positive detection pattern generation unit 60, and an optimization unit 70.

The detection rule name redefinition unit 10 redefines detection rule names using a standardized method so as to effectively generate TC-keyword trees for detected data including true positives (TP) and false positives (FP). In this case, true positives (TP) may be regarded as true detection, and false positives (FP) may be regarded as false detection.

The detection rule name redefinition unit 10 may be regarded as being contained in an Intrusion Detection System (IDS) 100. Meanwhile, the IDS 100 further includes a database (DB) 14 (see FIG. 3) for storing a detection rule group cRuleSet having a plurality of detection rules, and a detection engine 12 (see FIG. 3). The detection engine 12 compares the packet of input network traffic with the detection rules of the detection rule group cRuleSet, and outputs a detection event if there is a detection rule corresponding to the packet.

As each detection event is received, the transformed detected data generation unit 20 changes pieces of original detected data, which are detected based on current detection rules causing the corresponding detection event, to pieces of transformed detected data complying with a transformed detected data standard. That is, the transformed detected data generation unit 20 acquires a collection of original data detected by applying currently utilized detection rules (all pieces of detection event data including true positives (TP) and false positives (FP)), and generates transformed detected data complying with a defined transformed detected data standard.

The transformed detected data classification unit 30 sequentially classifies pieces of transformed detected data, output from the transformed detected data generation unit 20, according to predetermined types. That is, the transformed detected data classification unit 30 configures groups for respective attack types by classifying pieces of detected data by defined attack type, and then configures sub-groups by classifying the generated groups for respective attack types by original detection rule. In greater detail, the transformed detected data classification unit 30 firstly classifies pieces of transformed detected data, output from the transformed detected data generation unit 20, by attack type. Then, the transformed detected data classification unit 30 secondly classifies the pieces of transformed detected data for respective attack types by current detection rule. Finally, the transformed detected data classification unit 30 thirdly classifies the pieces of transformed detected data for respective detection rules into true positives/false positives.

The TC-keyword tree generation unit 40 generates a true positive (TP) TC-keyword tree (that is, a TC-keyword tree for transformed detected data classified as true positives (TP)) and a false positive (FP) TC-keyword tree (that is, a TC-keyword tree for transformed detected data classified as false positives (FP)), on the basis of all of pieces of transformed detected data classified by the transformed detected data classification unit 30.

The true positive path identification unit 50 compares the TP TC-keyword tree and the FP TC-keyword tree output from the TC-keyword tree generation unit 40 with each other, eliminates false positive nodes, and generates true positive nodes. Further, the true positive path identification unit 50 identifies a true positive path connecting a base node to the true positive nodes in the TP TC-keyword tree. In other words, the true positive path identification unit 50 eliminates the symbols of the FP TC-keyword tree while comparing the TP TC-keyword tree with the FP TC-keyword tree, and is then capable of generating a new TP TC-keyword tree composed of only true positive keywords.

The true positive detection pattern generation unit 60 generates true positive detection patterns based on the true positive path identified by the true positive path identification unit 50.

The optimization unit 70 arranges the true positive detection patterns generated by the true positive detection pattern generation unit 60 as simple patterns, and creates new detection rules from the arranged simple patterns. The optimization unit 70 optimizes the created new detection rules by applying them to the detection rule group (that is, cRuleSet). Here, upon applying the created new detection rules to the existing detection rule group (that is, cRuleSet) and then optimizing the new detection rules, it is preferable to apply the new detection rules depending on the detection rule names redefined by the detection rule name redefinition unit 10. That is, the new detection rules are stored in the DB 14 and may be regarded as having information depending on the redefined detection rule names.

Although the true positive detection pattern generation unit 60 and the optimization unit 70 are shown as separate components in FIG. 1, they may be represented by a single integrated block.

Figure 2:
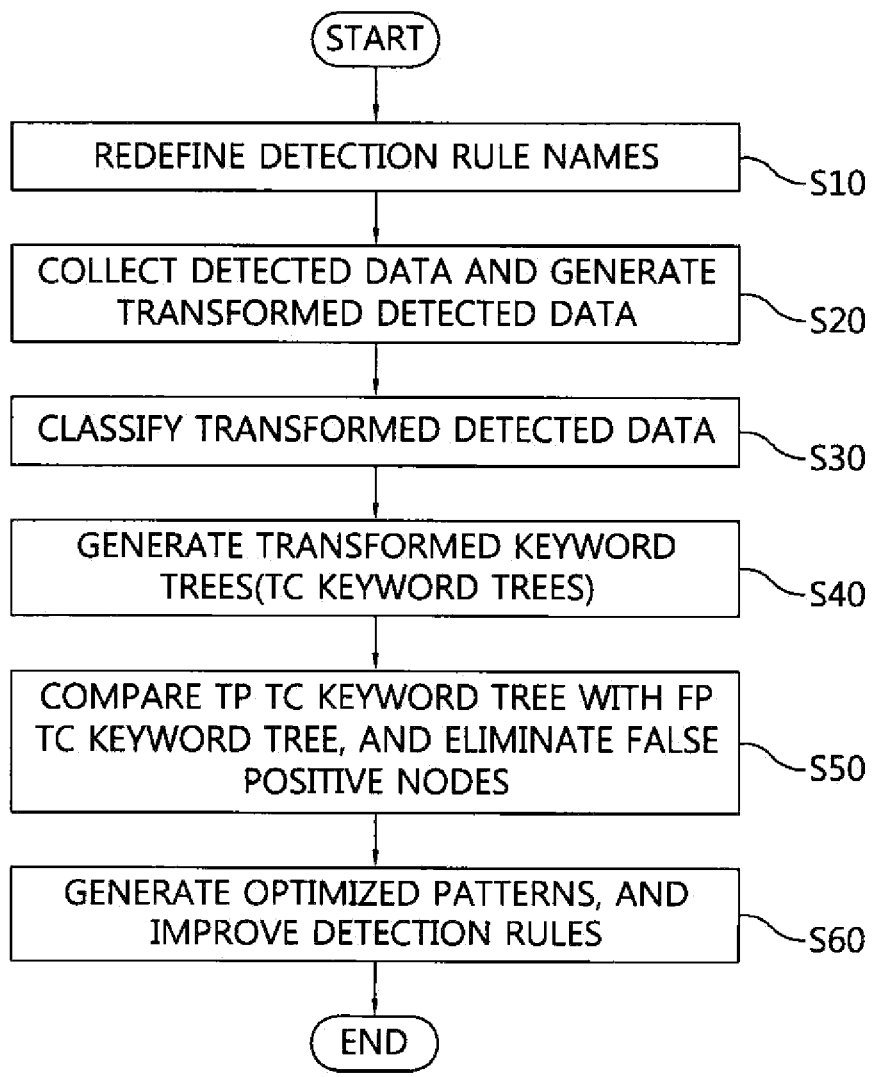
FIG. 2 is a flowchart showing a method for improving the detection performance of an intrusion detection system according to an embodiment of the present invention.
Figure 3:
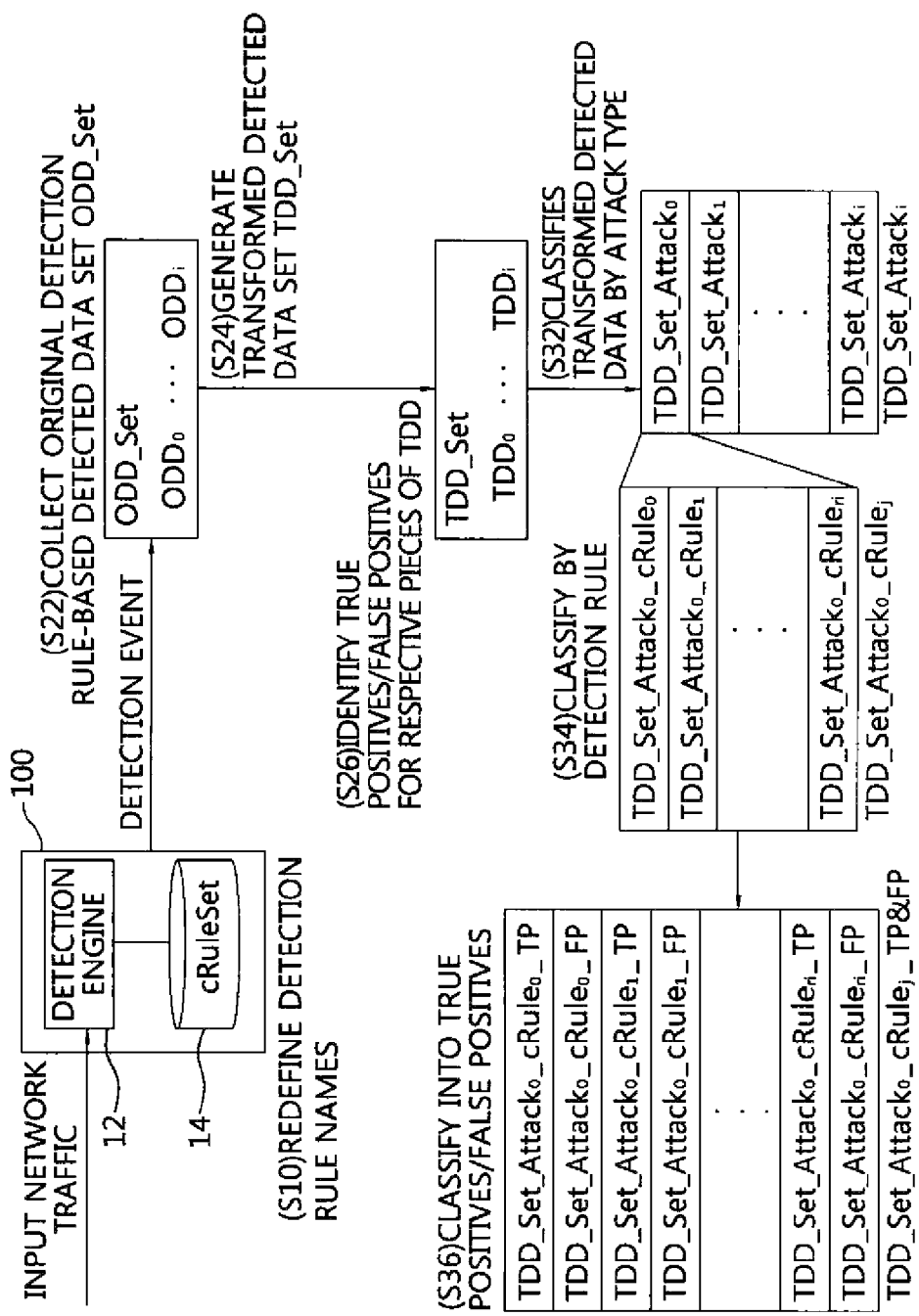
FIG. 3 is a flowchart showing, in detail, operations ranging from a detection rule name redefinition step to a transformed detected data classification step shown in FIG. 2.
Figure 4:
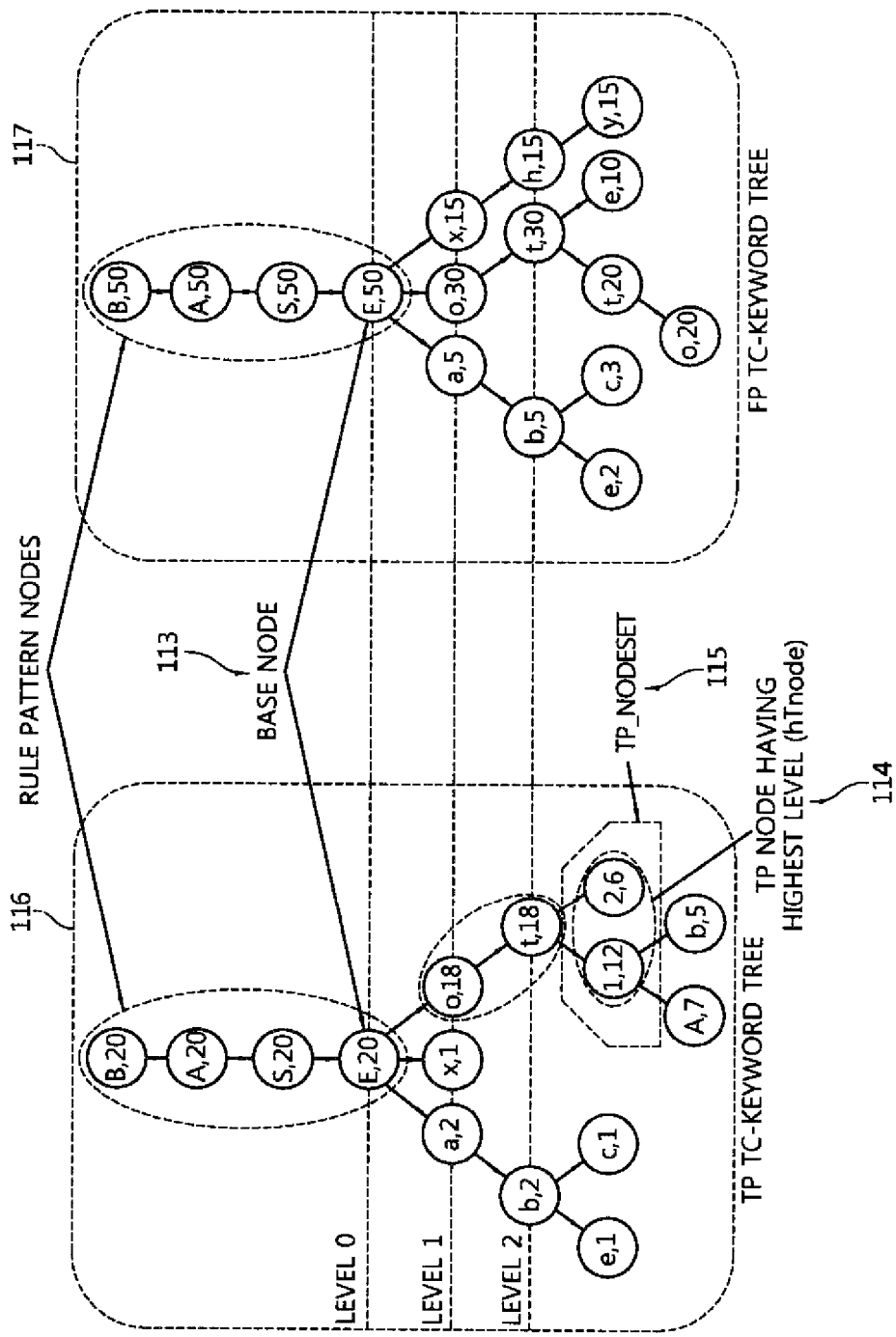
FIG. 4 is a diagram employed in the description of a transformed keyword tree generation step and a true positive/false positive keyword tree comparison and false positive node elimination step shown in FIG. 2.

FIG. 2 is a flowchart showing a method for improving the detection performance of an intrusion detection system according to an embodiment of the present invention, FIG. 3 is a flowchart showing, in detail, operations ranging from a detection rule name redefinition step to a transformed detected data classification step shown in FIG. 2, and FIG. 4 is a diagram employed in the description of a transformed keyword tree generation step and a true positive/false positive keyword tree comparison and false positive node elimination step shown in FIG. 2.

First, at step S10, detection rule names are redefined. In order for the detection rule name redefinition unit 10 of the intrusion detection system 100 to effectively generate TC-keyword trees for detected data including true positives (TP) and false positives (FP), the detection rule names are redefined using a standardized method. Here, the format of redefinition of detection rule names is configured so that each detection rule to be changed includes an attack type field, a rule type field, a description field, a creation date field, and an improvement number field. For example, the attack type field may be provided to identify attack types by numerals in such a way as to indicate "1" in the case of malicious code, "2" in the case of service denial, and "3" in the case of unauthorized access. The rule type field may be provided to identify rule types by numerals in such a way as to indicate "1" in the case of an IP-based detection rule and "2" in the case of a pattern-based detection rule.

In this way, the detection rule name redefinition unit 10 redefines all detection rule names depending on the format of redefinition of detection rule names. For example, when the detection rule "12.worm-conficker(injection).130202001" is interpreted, an attack type is malicious code, a rule type is a pattern-based rule, a description is worm-conficker(injection), generation date is Feb. 2, 2013, and an improvement number is 001.

Together with this function, the detection engine 12 of the intrusion detection system (IDS) 100 compares the packet of the input network traffic with current detection rules belonging to the set cRuleSet of the DB 14, and outputs a detection event if a detection rule corresponding to the packet is present in the DB 14. Here, all pieces of data detected by the intrusion detection system 100 may be designated as original detected data (ODD), and the current detection rules may be designated as cRuleSet. In this case, cRuleSet may be represented by cRuleSet={cRule$_0$, cRule$_1$, cRule$_2$, cRule$_3$, cRule$_{(r-1)}$} (the number of current detection rules=r). Based on the above description, the intrusion detection system 100 may be regarded as including the detection rule name redefinition unit 10, the detection engine 12, and the DB 14.

At step S20, pieces of detected data are collected and pieces of transformed detected data are generated. In more detail, the transformed detected data generation unit 20 collects pieces of detected data (that is, original detection rule-based detected data) that are detected by applying current detection rules, and configures a set ODD_Set of original detection rule-based detected data based on the pieces of detected data at step S22.

Thereafter, the transformed detected data generation unit 20 configures the set ODD_Set of original detection rule-based detected data as a set TDD_Set of pieces of transformed detected data TDD complying with a defined transformed detected data standard at step S24. In other words, the transformed detected data generation unit 20 changes the original detection rule-based detected data ODD to transformed detected data TDD including essential components and true positive/false positive identification information so as to effectively apply the original detection rule-based detected data ODD to the detection rule optimization procedure. Here, the transformed detected data TDD standard includes a serial number (SID) field, a message (MSG) field, a source IP (srcIP) field, a source port (srcPort) field, a destination IP (dstIP) field, a destination port (dstPort) field, a payload field, and a true positive/false positive identification information (result) field for detection rules. In the message field, a message (for example, help) configured to be viewed by control personnel or the like may be recorded for each detection rule. The message field is a selective item together with the serial number (SID) field of the detection rule and is not an essential field to be provided. Meanwhile, upon generating the transformed detected data set TDD_Set, the transformed detected data generation unit 20 generates the transformed detected data set TDD_Set from the original detection rule-based detected data ODD in compliance with the TDD standard. The generated transformed detected data set TDD_Set=∪ transform (ODD$_i$), and the size of the universal set is identical to that of the original detection rule-based detected data set ODD_Set.

Further, the transformed detected data generation unit 20 generates a transformed detected data set TDD_Set in which true positives (TP) and false positives (FP) are identified at step S26. That is, in the true positive/false positive identification information (result) field of the TDD standard, information, input by control personnel who determines the true positives/false positives of ODD, is present, and then the transformed detected data set TDD_Set in which true positives (TP) and false positives (FP) are identified may be generated based on the input information.

Thereafter, at step S30, the pieces of transformed detected data are classified. In more detail, the transformed detected data classification unit 30 classifies the pieces of transformed detected data according to predetermined types. First, the transformed detected data classification unit 30 classifies the pieces of transformed detected data by attack type at step S32. For example, if the number of attack types is 'a', an arbitrary attack type may be defined as Attack$_i$ (=Attack$_0$|Attack$_1$|Attack$_2$| . . . Attack$_{(n-4)}$). The present invention classifies attacks into four types, that is, malicious code, service denial, unauthorized access, and complex configuration, for convenience of description. In this case, the transformed detected data set corresponding to the attack type Attack$_i$ is TDD_Set_Attack$_i$. Therefore, the transformed detected data set TDD_Set that can be classified into the four attack types exemplified above may be "TDD_Set=∪ TDD_Set_Attack$_i$(0≤i≤3)."

Thereafter, the transformed detected data classification unit 30 classifies the pieces of transformed detected data, classified by attack type, by detection rule at step S34. That is, TDD_Set_Attack$_i$ is reclassified based on the detection rules of the current detection rule set cRuleSet. Accordingly, TDD_Set_Attack$_i$_crule$_j$ is created, wherein TDD_Set_Attack$_i$_crule$_j$ is a set of transformed detected data corresponding to attack type Attack; detected by the current detection rule crule$_j$. Meanwhile, TDD_Set_Attack$_i$=∪TDD_Set_Attack$_i$_crule$_j$ (0≤i≤ODD_Set size).

Further, the transformed detected data classification unit 30 classifies the pieces of transformed detected data, classified by detection rule, into true positives/false positives at step S36. That is, TDD_Set_Attack$_i$_crule$_j$ is classified and grouped into sets for true positives (TP) and false positives (FP). Here, TDD_Set_Attack$_i$_crule$_j$ classified as true positives is defined as "TDD_Set_Attack$_i$_crule$_j$_ TP=∪TDD_Set_Attack$_i$_crule$_j$_TP$_k$." This may be interpreted as a set identified as true positives (TP) in the TDD set corresponding to attack type Attack$_i$ detected by the current detection rule crule$_j$.

Meanwhile, TDD_Set_Attack_crule$_j$ classified as false positives is defined as "TDD_Set_Attack$_i$_crule$_j$_FP=∪ TDD_Set_Attack$_i$_crule$_j$_FPk." This may be interpreted as a set identified as false positives (FP) in the TDD set corresponding to the attack type Attack, detected by the current detection rule crule$_j$.

Next, at step S40, transformed keyword (TC-keyword) trees are generated for all pieces of transformed detected data. Typical keyword trees maintain symbols on their edges, but the present invention uses TC-keyword trees differing from the keyword trees. That is, each node of the TC-keyword trees in the present invention is represented by a pair. For example, a representation method at position i is called TC_KeywordTree_Node_P$_i$, which is defined as TC_KeywordTree_Node_P$_i$=(s$_i$, tc$_i$), where s$_i$ denotes a symbol value at position i of a TC-keyword tree and tc$_i$ denotes a path value (traversal count: TC) passing through the corresponding symbol at position i of the TC-keyword tree.

Upon generating true positive (TP)/false positive (FP) TC-keyword trees, the detection patterns of the current detection rules are changed to nodes, and are used as criteria for generating detection rule pattern nodes of the TC-keyword trees. Further, detection rule pattern nodes are generated based on four or more consecutive nodes depending on the deepest node, the traversal count (TC) value of which has the number of true positive events, with reference to the TC values of the nodes of the TC-keyword trees. For example, when "BASE" is registered as a detection pattern, nodes are "B", "A", "S", and "E", and a connection value is "B|A|S|E".

The TC-keyword tree generation unit 40 generates true positive (TP) and false positive (FP) TC-keyword trees, based on all pieces of transformed detected data. First, the generation of a TP TC-keyword tree 116 (see FIG. 4) will be described. The TC-keyword tree generation unit 40 extracts detected patterns from detected data classified as true positives (TP). Criteria for extraction are configured to extract all patterns having a length of four or more digits from TDD_Set_Attack$_i$_crule$_j$_TP (true positive data among pieces of TDD having attack type Attack, and detected by current detection rules crule$_j$) and then generate true positive (TP) patterns. If it is assumed that Pattern(TDD_Set_Attack$_i$_ crule$_j$_TP)={P$_0$, P$_1$, . . . , P$_{tp1}$}, respective patterns may be obtained as P$_0$="BASEabe", P$_1$="BASEabc", P$_2$="BASEx", P$_3$="BASEot1a", P$_4$="BASEot1b", and P$_5$="BASEot2".

Meanwhile, upon generating an FP TC-Keyword Tree 117 (see FIG. 4), the TC-keyword tree generation unit 40 extracts detected patterns from detected data classified as false positives (FP). Criteria for extraction are configured to extract all patterns having a length of four or more digits from TDD_Set_Attack$_i$_crule$_j$_FP (false positive data among pieces of TDD having attack type Attack$_i$ and detected by current detection rules crule$_j$), and generate false positive (FP) patterns. If it is assumed that Pattern (TDD_Set_Attack$_i$_crule$_j$_FP)={P$_0$, P$_1$, . . . , P$_{tp1}$} respective patterns may be obtained as P$_0$="BASEabe", P$_1$="BASEabc", P$_2$="BASEotto", P$_3$="BASEote", and P$_4$="BASExhy."

Thereafter, at step S50, the true positive path identification unit 50 compares the TP TC-keyword tree with the FP TC-keyword tree, and eliminates false positive (FP) nodes. First, the true positive path identification unit 50 identifies respective base nodes 113 (see FIG. 4) from the TP TC-keyword tree 116 (see FIG. 4) and the FP TC-keyword tree 117 (see FIG. 4). In other words, the true positive path identification unit 50 designates the last node of the nodes, starting from a root node and passing along the same path in each of the TP TC-keyword tree 116 (see FIG. 4) and the FP TC-keyword tree 117 (see FIG. 4), as the base node 113 (see FIG. 4). That is, in the TP TC-keyword tree 116 or in the FP TC-keyword tree 117, the deepest node having the highest tree level among all passing nodes is set to the base node 113.

Then, the true positive path identification unit 50 identifies a true positive node set TP_NodeSet. In other words, the true positive path identification unit 50 compares the TP TC-keyword tree 116 with the FP TC-keyword tree 117, and designates nodes, remaining only in the TP TC-keyword tree 116 after the nodes of the FP TC-keyword tree 117 have been excluded from the TP TC-keyword tree 116, as a true positive node set TP_NodeSet 115 (see FIG. 4). For example, in FIG. 4, if the TP TC-keyword tree 116 is compared with the FP TC-keyword tree 117, and nodes having the same symbols between the trees 116 and 117 are eliminated, node(1,12) and node(2,6) remain in the TP TC-keyword tree 116. Therefore, the true positive node set TP_NodeSet 115 is completed by the node (1,12) and the node (2,6). It may be considered that TP_NodeSet=NodeSet (TP TC-keyword tree)−NodeSet(FP TC-keyword Tree)={T$_{node0}$, T$_{node1}$, T$_{node2}$, T$_{node3}$, . . . , T$_{noden}$}.

Further, the true positive path identification unit 50 identifies the connection path of the true positive node set TP_NodeSet. That is, of the true positive node set TP_NodeSet 115, a node closest to the base node 113 in the TP TC-keyword tree 116 is found, and is called a high node hTNode 114 (see FIG. 4). Further, a path connected from the base node 113 of the TP TC-keyword tree 116 to the high node hTNode 114 is found. Even if the number of high nodes hTNode is two or more, the corresponding path is found, and all identified paths are designated as a true positive path set. In other words, the true positive path identification unit 50 searches for the node (that is, the high node 114) between the base node 113 of the TP TC-keyword tree 116 and the true positive node set TP_NodeSet 115, and thereafter designates a connection path from the root node of the TP TC-keyword tree 116 to the true positive node set TP_NodeSet 115 via the high node 114 as a true positive path. As shown in FIG. 4, when a plurality of nodes are present in the true positive node set TP_NodeSet, connection paths to respective nodes are designated as true positive paths, and a set of the true positive paths is designated as a true positive path set. For example, when true positive paths are identified with reference to FIG. 4, a true positive path of "B→A→S→E→o→t→1" and a true positive path of "B→A→S→E→o→t→2" may be identified.

Finally, at step S60, the true positive detection pattern generation unit 60 generates true positive detection patterns, and the optimization unit 70 optimizes the detection rules. First, the true positive detection pattern generation unit 60 arranges all true positive detection patterns based on the true positive paths identified at step S50 as simple patterns. For example, the simple pattern of the true positive path "B→A→S→E→o→t→1" identified based on FIG. 4 is "BASEot1," and the simple pattern of the second true positive path "B→A→S→E→o→t→2" is "BASEot2." Thereafter, the true positive detection pattern generation unit 60 turns all simple patterns arranged in this way into new detection rules. When the new detection rules are created, they apply snort-based detection rule creation grammar.

Thereafter, the optimization unit 70 optimizes the created new detection rules by applying them to the detection rule group cRuleSet.

An optimization process is periodically applied to pieces of data detected by the created new detection rules and existing detection rules that are created in this way, and thus the detection rules may be optimized.

In accordance with the present invention having the above configuration, the true positive rate and the false positive rate of previously applied intrusion detection rules are periodically evaluated, and intrusion detection rules, which are previously created using software and applied, are automatically improved and changed, thus obtaining the advantage of improving the true positive rate.

In particular, for network traffic identified as intrusion true positives in existing detection rules, the true positive rate may be maximized in automatically created detection rules. This is, the true positive rate of events detected by detection rules is improved, and the periodic evaluation and automatic improvement of created intrusion detection rules are systematically performed, thus obtaining the advantages of improving the true positive rate of detection rules and reducing the false positive rate of detection events.

By means of these advantages, the time required by security control personnel to analyze security events caused by intrusion detection rules used in an intrusion detection system can be reduced, and the true positive rate of detection rules can be improved, thus enhancing the efficiency of the overall security control tasks.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for improving detection performance of an intrusion detection system, comprising:
    a transformed detected data generator implemented in a hardware processor, which changes pieces of original detected data, detected based on current detection rules, to pieces of transformed detected data complying with a transformed detected data standard;
    a transformed detected data classifier implemented in a hardware processor, which classifies the pieces of transformed detected data by attack type, classifies pieces of transformed detected data for respective attack types by current detection rule, and classifies pieces of transformed detected data for respective detection rules into true positives/false positives;
    a transformed keyword tree generator implemented in a hardware processor, which generates a true positive transformed keyword tree and a false positive transformed keyword tree, based on results of classification by the transformed detected data classifier;
    a true positive path identifier implemented in a hardware processor, which generates a true positive node by comparing the true positive transformed keyword tree with the false positive transformed keyword tree, and identifies a true positive path connecting a base node to the true positive node in the true positive transformed keyword tree; and
    a true positive detection pattern generator implemented in a hardware processor, which generates a true positive detection pattern based on the identified true positive path.

2. The apparatus of claim 1, wherein the transformed detected data standard includes a plurality of fields including source Internet Protocol (IP) field, source port field, destination IP field, destination port field, payload field, and true positive/false positive identification information field.

3. The apparatus of claim 2, wherein the plurality of fields further include a serial number field or a message field for detection rules.

4. The apparatus of claim 1, wherein the true positive transformed keyword tree includes a plurality of nodes, each including a symbol at a current position and a traversal count value passing through the symbol at the current position.

5. The apparatus of claim 1, wherein the false positive transformed keyword tree includes a plurality of nodes, each including a symbol at a current position and a traversal count value passing through the symbol at the current position.

6. The apparatus of claim 1, wherein the true positive path identifier sets a node, remaining after nodes of the false positive transformed keyword tree have been excluded from the true positive transformed keyword tree, to the true positive node.

7. The apparatus of claim 1, wherein the true positive path identifier searches for a node between the base node of the true positive transformed keyword tree and the true positive node, and sets a connection path from a root node of the true positive transformed keyword tree to the true positive node via the searched node, as the true positive path.

8. The apparatus of claim 1, wherein the true positive detection pattern generator creates a new detection rule based on the generated true positive detection pattern.

9. A method for improving detection performance of an intrusion detection system, comprising:
    changing, by a transformed detected data generation unit, pieces of original detected data, detected based on current detection rules, to pieces of transformed detected data complying with a transformed detected data standard;
    classifying, by a transformed detected data classification unit, the pieces of transformed detected data by attack type, classifying, by the transformed detected data classification unit, pieces of transformed detected data for respective attack types by current detection rule, and classifying, by the transformed detected data classification unit, pieces of transformed detected data for respective detection rules into true positives/false positives;
    generating, by a transformed keyword tree generation unit, a true positive transformed keyword tree and a false positive transformed keyword tree, based on results of the classification;
    generating, by a true positive path identification unit, a true positive node by comparing the true positive transformed keyword tree with the false positive transformed keyword tree, and identifying, by the true positive path identification unit, a true positive path connecting a base node to the true positive node in the true positive transformed keyword tree; and
    generating, by a true positive detection pattern generation unit, a true positive detection pattern based on the identified true positive path.

10. The method of claim 9, wherein the transformed detected data standard includes a plurality of fields including source Internet Protocol (IP) field, source port field, destination IP field, destination port field, payload field, and true positive/false positive identification information field.

11. The method of claim 10, wherein the plurality of fields further include a serial number field or a message field for detection rules.

12. The method of claim 9, wherein the true positive transformed keyword tree includes a plurality of nodes, each including a symbol at a current position and a traversal count value passing through the symbol at the current position.

13. The method of claim 9, wherein the false positive transformed keyword tree includes a plurality of nodes, each including a symbol at a current position and a traversal count value passing through the symbol at the current position.

14. The method of claim 9, wherein identifying the true positive path is configured to set a node, remaining after nodes of the false positive transformed keyword tree have been excluded from the true positive transformed keyword tree, to the true positive node.

15. The method of claim 9, wherein identifying the true positive path is configured to search for a node between the base node of the true positive transformed keyword tree and the true positive node, and set a connection path from a root node of the true positive transformed keyword tree to the true positive node via the searched node, as the true positive path.

16. The method of claim 9, wherein generating the true positive detection pattern is configured to create a new detection rule based on the generated true positive detection pattern.

* * * * *